United States Patent
Yoneyama et al.

(10) Patent No.: US 9,700,942 B2
(45) Date of Patent: Jul. 11, 2017

(54) METHOD FOR PRODUCING SEED CRYSTALS USED FOR PRODUCING HYDROGEN-REDUCED NICKEL POWDER

(71) Applicant: SUMITOMO METAL MINING CO., LTD., Tokyo (JP)

(72) Inventors: Tomoaki Yoneyama, Niihama (JP); Shin-ichi Heguri, Niihama (JP); Hideki Ohara, Niihama (JP); Osamu Ikeda, Niihama (JP); Yohei Kudo, Niihama (JP)

(73) Assignee: Sumitomo Metal Mining Co., Ltd. (JP)

( * ) Notice: Subject to any disclaimer, the term of this patent is extended or adjusted under 35 U.S.C. 154(b) by 0 days.

(21) Appl. No.: 15/117,840

(22) PCT Filed: Feb. 3, 2015

(86) PCT No.: PCT/JP2015/052908
§ 371 (c)(1),
(2) Date: Aug. 10, 2016

(87) PCT Pub. No.: WO2015/122315
PCT Pub. Date: Aug. 20, 2015

(65) Prior Publication Data
US 2017/0008089 A1 Jan. 12, 2017

(30) Foreign Application Priority Data
Feb. 17, 2014 (JP) ................................. 2014-027899

(51) Int. Cl.
*B22F 9/26* (2006.01)
*B22F 9/24* (2006.01)
*B22F 1/00* (2006.01)

(52) U.S. Cl.
CPC .............. *B22F 9/26* (2013.01); *B22F 1/0003* (2013.01); *B22F 9/24* (2013.01);
(Continued)

(58) Field of Classification Search
None
See application file for complete search history.

(56) References Cited

U.S. PATENT DOCUMENTS

| | | | |
|---|---|---|---|
| 6,939,390 B2 * | 9/2005 | Toshima | H01B 1/02 75/369 |
| 2010/0031775 A1 * | 2/2010 | Seo | B22F 9/24 75/364 |

FOREIGN PATENT DOCUMENTS

| | | | |
|---|---|---|---|
| CA | 2938194 A1 * | 8/2015 | |
| JP | 2005-240164 | 9/2005 | |

(Continued)

OTHER PUBLICATIONS

"The manufacture and properties of Metal powder produced by the gaseous reduction of aqueous solutions", Powder metallurgy, No. 1/2 (1958), pp. 40-52.

(Continued)

*Primary Examiner* — George Wyszomierski
(74) *Attorney, Agent, or Firm* — Gerald E. Hespos; Michael J. Porco; Matthew T. Hespos

(57) ABSTRACT

Provided are a method for producing nickel seed crystals that maintains and improves the quality of nickel powder at a low cost while suppressing production cost and environmental load in the production of nickel powder, by optimizing the amount of hydrazine added when producing fine nickel powder as seed crystals using hydrazine; and a method for producing nickel powder using the nickel seed crystals. The method for producing seed crystals used for producing hydrogen-reduced nickel powder, including adding, to an acid solution containing nickel ions that is (Continued)

maintained at a temperature of 50 to 60° C., hydrazine of 1 to 1.25 mol per 1 mol of a nickel component contained in the acid solution to produce the seed crystals.

2 Claims, 1 Drawing Sheet

(52) U.S. Cl.
CPC ... *B22F 2009/245* (2013.01); *B22F 2201/013* (2013.01); *B22F 2301/15* (2013.01); *B22F 2998/10* (2013.01)

(56) References Cited

FOREIGN PATENT DOCUMENTS

| | | |
|---|---|---|
| JP | 2009-227908 | 10/2008 |
| JP | 2010-242143 | 10/2010 |
| JP | 2013-14813 | 1/2013 |
| JP | 2013-221192 | 10/2013 |
| WO | 2008/001741 | 1/2008 |
| WO | 2012/114637 | 8/2012 |

OTHER PUBLICATIONS

International Search Report.

\* cited by examiner

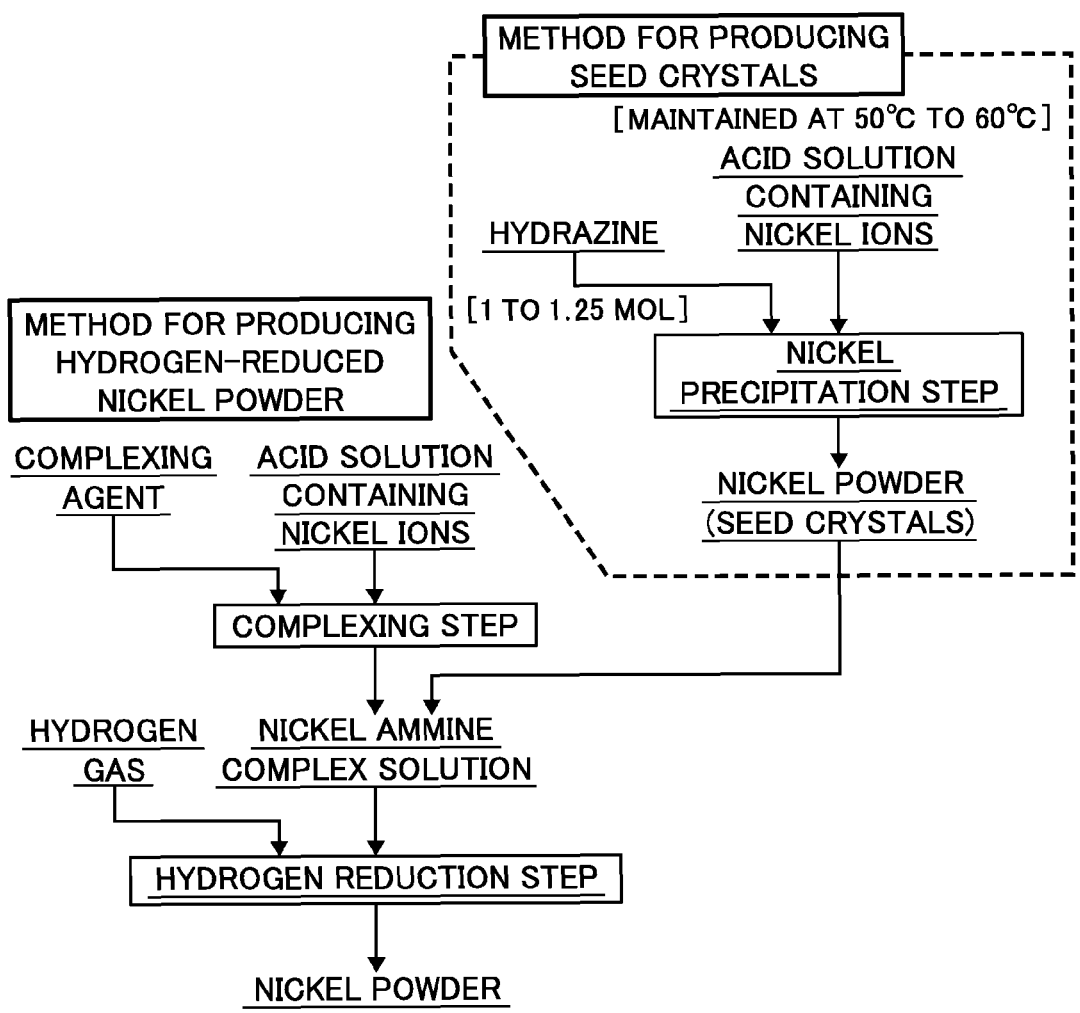

METHOD FOR PRODUCING SEED CRYSTALS USED FOR PRODUCING HYDROGEN-REDUCED NICKEL POWDER

BACKGROUND

1. Field of the Invention

The present invention relates to a method for producing seed crystals used for a method for producing nickel powder by adding seed crystals to an acid solution and blowing hydrogen gas to reduce the solution.

2. Description of the Related Art

Examples of the method for smelting nickel include a method of roasting an ore into the form of a sulfide or an oxide and reducing the sulfide or the oxide to obtain ferronickel which is an alloy with iron to provide it as a raw material for stainless steel, and a method of separating impurities from an acid solution in which a sulfide is dissolved in hydrochloric acid or sulfuric acid and electrowinning the acid solution to obtain electric nickel. Further, a nickel salt such as nickel sulfate and nickel chloride may be recovered from the acid-dissolved solution and used for plating, a battery material, and the like.

In addition, examples of a method for producing nickel powder in a powder state from the nickel salt include a hydrometallurgical process shown in Japanese Patent Laid-Open No. 2005-240164.

The method of Japanese Patent Laid-Open No. 2005-240164 is a so-called complexing reduction method including mixing a nickel sulfate aqueous solution with a complexing agent to subject the mixture to complexing treatment to form a nickel ammine complex solution, putting the solution in a pressurized container, sealing the container, heating the solution to about 150 to 250° C. followed by maintaining the temperature, and blowing hydrogen gas into the solution, in which the nickel ammine complex is reduced by hydrogen to produce nickel powder.

The above method of reduction using hydrogen gas allows an industrially stable operation and is a production method suitable for mass production.

However, when metallic particles are intended to be obtained by reduction reaction, there has been a problem that, if a reducing agent added and a solution do not uniformly react with each other, crystal nuclei is produced at random to produce an excessively fine powder, and it is difficult to obtain uniform particles to reduce the reduction efficiency.

Further, when a gas such as hydrogen gas as described above is blown into a solution, partially non-uniform growth is highly likely in the solution since the bubbles of the gas physically has a certain or larger particle size.

In the production of nickel powder, a reduction efficiency of about 80% or more is industrially required. If the reduction efficiency is excessively low, for example, less than 80%, there will be too much loss, and repeated production will be required, which is not preferred.

Therefore, there is used a method in which seed crystals are previously mixed in a solution and nickel particles are grown using the seed crystals as the nuclei. Since properties such as the size and shape of seed crystals to be used greatly influence the growth of particles, it is necessary to use uniform seed crystals.

Therefore, although there is also a method of repeatedly using a part of the product as seed crystals, the method has a problem that the time and efforts are required to process the product into sizes and properties suitable for seed crystals; and the yield is reduced since a part of the product once produced is repeatedly used, thus increasing the cost.

Therefore, it is industrially expected to use, as seed crystals, iron powder or a compound of iron which can be produced in a large amount as a product having uniform quality, and in Japanese Patent Laid-Open No. 2005-240164, an iron compound is added as seed crystals during reduction reaction to precipitate nickel on the iron compound.

However, there has been a problem that, since iron powder is used, the iron is mixed into the product; and therefore, it is difficult to use iron as seed crystals for the application requiring high purity quality.

On the other hand, Japanese Patent Laid-Open No. 2005-240164 and disclose methods of obtaining nickel powder using a reducing agent other than hydrogen gas.

Japanese Patent Laid-Open No. 2005-240164 provides nickel powder which is inexpensive, is excellent in weatherability, has low electric resistance in a state where it is kneaded with a resin, reduces initial electric resistance and electric resistance in use, can be stably used over a long period of time, and is suitable as conductive particles for a conductive paste and a conductive resin, and a method for producing the same. Specifically, the nickel powder disclosed in Japanese Patent Laid-Open No. 2005-240164 contains 1 to 20% by mass of cobalt with the balance consisting of nickel and unavoidable impurities, comprises secondary particles in which primary particles are aggregated, and has an oxygen content of 0.8% by mass or less. Cobalt is contained only in the surface layer of the secondary particles, and the cobalt content in the surface layer is preferably 1 to 40% by mass.

However, since an impurity such as cobalt is added as seed crystals also in the method of Japanese Patent Laid-Open No. 2005-240164, the quality of the product may be reduced by the mixing of cobalt into the product in the same manner as in the case of using iron as seed crystals.

Further, Japanese Patent Laid-Open No. 2010-242143 discloses a method for producing metal powder by a liquid phase reduction method that is improved so that a particle aggregate may be hardly produced.

The method for producing metal powder comprises a first step of dissolving a metal compound, a reducing agent, a complexing agent, and a dispersant to prepare an aqueous solution containing metal ions derived from the metal compound, and a second step of adjusting the pH of the aqueous solution to reduce the metal ions with the reducing agent to precipitate the metal powder.

Seed crystals obtained by this wet reaction method is preferred because it can precisely provide a powder having a primary particle size of 0.5 to 5.0 µm which is generally considered as the powder that can be most easily utilized as seed crystals. However, the method disclosed in Japanese Patent Laid-Open No. 2010-242143 has not been practical because the reagents such as a reducing agent and a dispersant to be added are expensive and have many problems in terms of cost for industrial use in a large amount. Particularly, when hydrazine is used as a reducing agent, there has also been a problem of an increase in environmental load such as an increase in wastewater treatment load in addition to an increase in cost.

As described above, there has been desired a method for producing nickel seed crystals that maintains and improves the quality of nickel powder at a low cost.

The present invention provides a method for producing nickel seed crystals that maintains and improves the quality of nickel powder at a low cost while suppressing the production cost and environmental load in the production of nickel powder, by optimizing the amount of hydrazine added when producing fine nickel powder as seed crystals using hydrazine, and a method for producing nickel powder using the nickel seed crystals.

SUMMARY

A first aspect of the present invention to solve the above problem is a method for producing seed crystals used for producing hydrogen-reduced nickel powder, the method including adding, to an acid solution containing nickel ions that is maintained at a temperature of 50° C. or more and 60° C. or less, hydrazine in an amount of 1 mol or more and 1.25 mol or less per 1 mol of a nickel component contained in the acid solution to produce the seed crystals.

A second aspect of the present invention is a method for producing hydrogen-reduced nickel powder in which the nickel powder is produced from an acid solution containing nickel ions by hydrogen reduction, the method including a hydrogen reduction step of adding a complexing agent and seed crystals to the acid solution containing nickel ions to form a complex solution containing nickel complex ions and seed crystals and then blowing hydrogen gas to reduce the nickel complex ions to produce nickel powder, wherein the seed crystals added are nickel powder produced by adding, to an acid solution containing nickel ions that is maintained at a temperature of 50° C. or more and 60° C. or less, hydrazine in an amount of 1 mol or more and 1.25 mol or less per 1 mol of a nickel component contained in the acid solution.

In third and fourth aspects of the present invention, the addition of hydrazine to an acid solution containing nickel ions is performed by adding, to the acid solution, a solution formed by mixing a mixed solution of sodium hydroxide and a complexing agent with a hydrazine solution containing hydrazine in an amount of 1 mol or more and 1.25 mol or less per 1 mol of a nickel component contained in the acid solution.

According to the present invention, the optimum range of the added amount of hydrazine that is used for producing nickel seed crystals required for producing nickel powder can be selected, the cost and environmental load can be reduced by preventing excessive use, and a large effect is made on suppressing the cost and environmental load, and an industrially remarkable effect can be thus achieved.

BRIEF DESCRIPTION OF DRAWING

FIG. 1 is a production flow chart showing the method for producing nickel powder as seed crystals according to the present invention, and the method for producing hydrogen-reduced nickel powder using the seed crystals.

DETAILED DESCRIPTION

As shown in FIG. 1, the present invention provides a method for producing hydrogen-reduced nickel powder using seed crystals in such a manner that the seed crystals are produced in advance by a production method in which uniform precipitation thereof is easily obtained, to stabilize the quality of nickel powder in a method for producing nickel powder by blowing hydrogen gas into a solution containing seed crystals to cause reduction reaction, and a method for producing the nickel powder as seed crystals to be produced in advance.

[Method for Producing Seed Crystals]

A production flow chart of the production method for obtaining seed crystals according to the present invention is shown in "Method for Producing Seed Crystals" of FIG. 1.

As shown also in FIG. 1, the present invention provides a method of obtaining nickel powder by wet reduction using a liquid chemical such as hydrazine.

In particular, the method is to produce desired seed crystals by subjecting a sample solution and a liquid reducing agent to liquid-liquid contact.

In this regard, since the reducing agent has a large impact on cost, the optimum amount of the reducing agent added has been grasped. AS a result, the present invention employs a method of suppressing excessive addition of the reducing agent.

More specifically, in the present invention, the autolytic reaction of hydrazine which is a reducing agent is suppressed by keeping the reaction temperature during the reduction in a specific range, and the range of a suitable addition equivalent has been grasped to prevent the addition of excessive hydrazine.

Specifically, the temperature of reduction reaction is suitably 50° C. or more and 60° C. or less.

If the temperature exceeds 60° C., the autolytic reaction of hydrazine will be accelerated, and the reducing agent will be insufficient if the addition equivalent is not increased. On the other hand, if the temperature is lower than 50° C., the temperature will not be practical since an extremely long reaction time is required, and stable production of nickel powder will be difficult because the reaction will not smoothly proceed and the conditions in a reaction vessel will tend to be nonuniform.

Further, if the amount of the reducing agent used exceeds 1.25 mol per 1 mol of nickel contained in a solution to be added, needless hydrazine which does not participate in the reaction will increase, which is not preferred, but if the amount of the reducing agent is less than 1.0 mol, the reducing agent will be insufficient.

To summarize, when the reaction temperature is 50 to 60° C. and hydrazine is added in an amount corresponding to 1.0 to 1.25 times the amount of nickel, nickel powder as seed crystals suitable for the seed crystals used in the production of hydrogen-reduced nickel powder can be obtained.

[Method for Producing Nickel Powder]

A production flow of the method for producing a hydrogen-reduced nickel powder according to the present invention is shown in "Method for Producing Hydrogen-Reduced Nickel Powder" of FIG. 1.

As shown also in FIG. 1, the method for producing a hydrogen-reduced nickel powder according to the present invention includes in sequence: a complexing step of forming a complex solution from an acid solution containing nickel ions; and a hydrogen reduction step of adding nickel powder as seed crystals to the resulting complex solution and reducing nickel complex ions in the complex solution by hydrogen gas to precipitate and grow nickel powder on the surface of the seed crystals with hydrogen as a reducing agent to form nickel powder. Particularly, for the seed crystals to be added, a higher rate of reduction is achieved by using the seed crystals produced by the method for producing seed crystals according to the present invention.

Note that, although not shown, when hydrazine is added in the method for producing seed crystals of the present invention, a solution is formed by mixing a mixed solution of a complexing agent and sodium hydroxide with a hydrazine solution having a predetermined concentration, and when the resulting solution is mixed with a solution containing nickel, nickel powder for seed crystals can be stably obtained, which is preferred.

EXAMPLES

The present invention will be described below in more detail using Examples.

Example 1

[Production of Seed Crystals]

Nickel seed crystals used as a core in the reduction step is produced by the production method to be shown below.

First, 89.55 g of reagent grade nickel sulfate hexahydrate (corresponding to 20 g of pure Ni) was taken in a container A and dissolved in the solution so that the concentration of nickel was 110 g/L, and the solution was heated to a temperature of 60° C. and the temperature was maintained.

Next, 48.9 ml of 25% aqueous ammonia solution was mixed with 95 ml of sodium hydroxide solution at a concentration of 250 g/L in an another container B, and the solution was heated to the same temperature as that in the container A, and the temperature was maintained.

A hydrazine solution at a concentration of 60% was added to the mixed solution in the container B maintained at a solution temperature of 60° C. in an amount of 1.25 in a molar ratio to the nickel component in the solution contained in the container A.

The solution in the container A and the solution in the container B were mixed, and the resulting solution was put in a container C and stirred for one hour while maintaining a solution temperature of 60° C. to form a slurry.

After a lapse of one hour, the slurry in the container C was subjected to solid-liquid separation; precipitated nickel powder was recovered; the recovered nickel powder was washed with water; and the washed nickel powder was then dried to produce nickel powder for seed crystals (nickel seed crystals) with a rate of recovery of 90% or more. (In this case, the reaction evaluation is rated as "good".)

Further, the average particle size of the resulting nickel powder as seed crystals was about 2

<Production of Nickel Powder>

[Addition of Seed Crystals]

To an aqueous solution of reagent grade nickel sulfate hexahydrate in an amount of 75 g in terms of nickel, were added 330 g of ammonium sulfate and 191 ml of 25% aqueous ammonia, and the total volume of the solution was adjusted to 1000 ml. To the resulting solution, were added 7.5 g of nickel powder for seed crystals prepared in the production of seed crystals described above and 1.5 g of sodium lignosulfonate as a dispersant to form a slurry.

[Hydrogen Reduction Step]

Next, the prepared slurry was put in an inner cylinder of an autoclave and heated to 185° C. with stirring, and the temperature was maintained. Hydrogen gas fed from a hydrogen gas bomb was blown into the slurry maintained at 185° C., and the hydrogen gas was fed so that the pressure in the inner cylinder of the autoclave was 3.5 MPa.

After a lapse of one hour from the feeding of hydrogen gas, the feeding of hydrogen gas was stopped, and the inner cylinder of the autoclave was cooled. After cooling, the slurry in the inner cylinder was removed and filtered to recover hydrogen-reduced nickel powder.

The amount of the hydrogen-reduced nickel powder recovered at that time was 70 g, and the rate of reduction calculated from the concentration of nickel remaining in the solution was at a level exceeding 80%. Thus, the usefulness of the method for producing nickel seed crystals according to the present invention was verified.

Note that, in the following Table 1 summarizing the results, when the rate of recovery of nickel powder as seed crystals was more than 90%, the reaction evaluation was rated as "good", and when the rate of recovery was less than 90%, the reaction evaluation was rated as "poor".

Example 2

Nickel powder was produced in the same manner as in Example 1 except that, in "Production of Seed Crystals" in Example 1, when the solution in the container A and the solution in the container B were mixed and subjected to reduction reaction, the solution temperature was maintained at 60° C., and 1.00 mol of hydrazine was added per 1 mol of nickel.

As a result, good reaction was verified in which the rate of recovery of nickel powder was 90% or more. The results are summarized in Table 1.

Example 3

Nickel powder was produced in the same manner as in Example 1 except that, in "Production of Seed Crystals" in Example 1, when the solution in the container A and the solution in the container B were mixed and subjected to reduction reaction, the solution temperature was maintained at 50° C., and 1.25 mol of hydrazine was added per 1 mol of nickel.

As a result, good reaction was verified in which the rate of recovery of nickel powder was 90% or more as in Examples 1 and 2. The results are summarized in Table 1.

Example 4

Nickel powder was produced in the same manner as in Example 1 except that, in "Production of Seed Crystals" in Example 1, when the solution in the container A and the solution in the container B were mixed and subjected to reduction reaction, the solution temperature was maintained at 50° C., and 1.00 mol of hydrazine was added per 1 mol of nickel.

As a result, good reaction was verified in which the rate of recovery of nickel powder was 90% or more as in Examples 1 to 3. The results are summarized in Table 1.

Comparative Example 1

Nickel powder was produced in the same manner as in Example 1 except that, in "Production of Seed Crystals" in Example 1, when the solution in the container A and the solution in the container B were mixed and subjected to reduction reaction, the solution temperature was maintained at 60° C., and 0.50 mol of hydrazine was added per 1 mol of nickel.

As a result, hydrazine was insufficient; nickel hydroxide coprecipitated with nickel powder since the system was basic; and the rate of recovery of nickel powder was less than 90%. The results are summarized in Table 1.

Comparative Example 2

Nickel powder was produced in the same manner as in Example 1 except that, in "Production of Seed Crystals" in Example 1, when the solution in the container A and the solution in the container B were mixed and subjected to reduction reaction, the solution temperature was maintained at 60° C., and 0.75 mol of hydrazine was added per 1 mol of nickel.

As a result, hydrazine was insufficient; nickel hydroxide coprecipitated with nickel powder since the system was basic; and the rate of recovery of nickel powder was less than 90%. The results are summarized in Table 1.

Comparative Example 3

Nickel powder was produced in the same manner as in Example 1 except that, in "Production of Seed Crystals" in Example 1, when the solution in the container A and the solution in the container B were mixed and subjected to reduction reaction, the solution temperature was maintained at 75° C., and 1.25 mol of hydrazine was added per 1 mol of nickel.

As a result, hydrazine was insufficient; nickel hydroxide coprecipitated with nickel powder since the system was basic; and the rate of recovery of nickel powder was less than 90%. The results are summarized in Table 1.

Comparative Example 4

Nickel powder was produced in the same manner as in Example 1 except that, in "Production of Seed Crystals" in Example 1, when the solution in the container A and the solution in the container B were mixed and subjected to reduction reaction, the solution temperature was maintained at 50° C., and 0.75 mol of hydrazine was added per 1 mol of nickel.

As a result, hydrazine was insufficient; nickel hydroxide coprecipitated with nickel powder since the system was basic; and the rate of recovery of nickel powder was less than 90%. The results are summarized in Table 1.

TABLE 1

|  | Reaction temperature [° C.] | Amount of hydrazine added/Ni ratio [mol] | Reaction evaluation |
| --- | --- | --- | --- |
| Example 1 | 60 | 1.25 | good |
| Example 2 | 60 | 1.00 | good |
| Example 3 | 50 | 1.25 | good |
| Example 4 | 50 | 1.00 | good |
| Comparative Example 1 | 60 | 0.50 | poor |
| Comparative Example 2 | 60 | 0.75 | poor |
| Comparative Example 3 | 75 | 1.25 | poor |
| Comparative Example 4 | 50 | 0.75 | poor | good: a rate of reduction of 90% or more,
poor: a rate of reduction of less than 90%

The invention claimed is:

1. A method for producing hydrogen-reduced nickel powder in which the nickel powder is produced from an acid solution containing nickel ions through hydrogen reduction, the method comprising:
a hydrogen reduction step of adding a complexing agent and seed crystals to the acid solution containing nickel ions to form a complex solution containing nickel complex ions and seed crystals and then blowing hydrogen gas to reduce the nickel complex ions to produce nickel powder,
wherein the seed crystals added are nickel powder produced by adding, to an acid solution containing nickel ions that is maintained at a temperature of 50 to 60° C., hydrazine of 1 to 1.25 mol per 1 mol of a nickel component contained in the acid solution.

2. The method for producing hydrogen-reduced nickel powder according to claim 1, wherein the complexing agent used in the hydrogen reduction step is a first complexing agent, and wherein the addition of hydrazine to the acid solution containing nickel ions is performed by adding, to the acid solution, a solution formed by mixing a mixed solution of sodium hydroxide and the first complexing agent or a second complexing agent with a hydrazine solution containing hydrazine of 1 to 1.25 mol per 1 mol of a nickel component contained in the acid solution.

* * * * *